US012809401B2

(12) United States Patent
(10) Patent No.: US 12,809,401 B2
(45) Date of Patent: Nov. 24, 2026

Sun et al.

(54) SHUTTLE VEHICLE TRAVELING AND POSITIONING CONTROL METHOD BASED ON ENCODER SELF-CORRECTION

(71) Applicant: KENGIC INTELLIGENT TECHNOLOGY CO., LTD., Qingdao (CN)

(72) Inventors: Yuan Sun, Qingdao (CN); Jiahao Jiang, Qingdao (CN); Guangyong Li, Qingdao (CN); Chun Wang, Qingdao (CN); Maojin Jiao, Qingdao (CN)

(73) Assignee: KENGIC INTELLIGENT TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 19/069,286

(22) Filed: Mar. 4, 2025

(65) Prior Publication Data

US 2025/0199548 A1 Jun. 19, 2025

Related U.S. Application Data

(63) Continuation-in-part of application No. PCT/CN2023/118526, filed on Sep. 13, 2023.

(30) Foreign Application Priority Data

Sep. 14, 2022 (CN) .......................... 202211113757.2

(51) Int. Cl.
*G05D 1/87* (2024.01)
*B65G 1/04* (2006.01)
(Continued)

(52) U.S. Cl.
CPC ............. *G05D 1/87* (2024.01); *G05D 1/2446* (2024.01); *G05D 1/646* (2024.01); *B65G 1/04* (2013.01);
(Continued)

(58) Field of Classification Search
CPC ...... B65G 1/04; B65G 1/0492; G05D 1/2446; G05D 1/245; G05D 1/646; G05D 1/87;
(Continued)

(56) References Cited

U.S. PATENT DOCUMENTS 5,809,448 A * 9/1998 Gimenez .................. B61F 5/22 701/72
6,397,129 B1 * 5/2002 Lanoix ...................... B61F 5/22 701/72
(Continued)

FOREIGN PATENT DOCUMENTS

CA 3100103 A1 * 12/2019 ........... B65G 1/0492
CN 201741039 U 2/2011
(Continued)

*Primary Examiner* — Babar Sarwar
(74) *Attorney, Agent, or Firm* — JEEN IP LAW, LLC

(57) ABSTRACT

Disclosed in the present invention is a shuttle vehicle traveling and positioning control method based on encoder self-correction. Provided is a self-correction solution based on track positioning identifiers and external encoders. When a shuttle vehicle travels through each identifier, information is fed back and a servo target position is updated instantaneously, so as to eliminate, at any time, a cumulative error caused by skidding; and the shuttle vehicle realizes a full-closed-loop traveling and positioning control process under the guidance of position information which is corrected at any time. The shuttle vehicle traveling and positioning control method based on encoder self-correction comprises the following implementation stages: 1) performing customization and initialization; 2) performing self-learning; 3) performing self-correction; 4) updating a target position; and 5) handling a position offset.

4 Claims, 2 Drawing Sheets

(51) Int. Cl.

| | |
|---|---|
| ***G05D 1/244*** | (2024.01) |
| ***G05D 1/646*** | (2024.01) |
| ***G05D 105/28*** | (2024.01) |
| ***G05D 107/70*** | (2024.01) |
| ***G05D 111/50*** | (2024.01) |

(52) U.S. Cl.
CPC ..... *G05D 2105/28* (2024.01); *G05D 2107/70* (2024.01); *G05D 2111/54* (2024.01)

(58) Field of Classification Search
CPC ........... G05D 2101/15; G05D 2105/28; G05D 2107/70; G05D 2109/10; G05D 2111/54
See application file for complete search history.

(56) References Cited

U.S. PATENT DOCUMENTS

| | | | | |
|---|---|---|---|---|
| 6,480,766 | B2 * | 11/2002 | Hawthorne | B61L 15/0072 701/19 |
| 6,704,626 | B1 * | 3/2004 | Herzog | B61L 25/025 701/19 |
| 6,758,147 | B2 * | 7/2004 | Howard | B61D 7/32 105/247 |
| 7,152,347 | B2 * | 12/2006 | Herzog | E01B 27/02 701/19 |
| 7,201,350 | B2 * | 4/2007 | Sugita | B61L 27/20 246/4 |
| 7,266,438 | B2 * | 9/2007 | Kellum | G01C 21/3697 340/436 |
| 7,437,997 | B2 * | 10/2008 | Herzog | E01B 35/00 104/5 |
| 8,423,240 | B2 * | 4/2013 | Mian | B61L 27/57 701/19 |
| 10,525,994 | B2 * | 1/2020 | Le Bastard | B61L 25/021 |
| 11,820,389 | B2 * | 11/2023 | Austrheim | B61B 13/00 |
| 2021/0198041 | A1 * | 7/2021 | Austrheim | B61B 13/00 |

FOREIGN PATENT DOCUMENTS

| | | | | | |
|---|---|---|---|---|---|
| CN | 108945936 | A | | 7/2018 | |
| CN | 110716564 | A | | 1/2020 | |
| CN | 111377356 | B | | 7/2020 | |
| CN | 112068558 | A | | 12/2020 | |
| CN | 112978272 | A | * | 6/2021 | B65G 43/00 |
| CN | 114578799 | A | | 6/2022 | |
| CN | 115525051 | A | | 12/2022 | |
| EP | 3807181 | B1 | * | 11/2023 | G05D 1/221 |
| KR | 101684410 | B1 | | 12/2016 | |
| WO | WO-2019238641 | A1 | * | 12/2019 | B65G 65/23 |
| WO | 2024055987 | A1 | | 3/2024 | |

* cited by examiner

SHUTTLE VEHICLE TRAVELING AND POSITIONING CONTROL METHOD BASED ON ENCODER SELF-CORRECTION

CROSS-REFERENCE TO RELATED APPLICATIONS

This application is a continuation of PCT/CN2023/118526, filed on Sep. 13, 2023 and claims priority of Chinese Patent Application No. 202211113757.2, filed on Sep. 14, 2022, the entire contents of which are incorporated herein by reference.

TECHNICAL FIELD

The present invention relates to a novel control method for shuttle vehicle traveling and positioning, belonging to the field of logistics and warehousing.

BACKGROUND

At present, in the field of logistics and warehousing, automation and intelligent control technologies have rapidly developed. With the continuous rise in industrial and commercial land costs and labor expenses, dense transit warehouses have gained high operational efficiency by fully utilizing space efficiency and reducing labor demand. Multi-layer shuttle vehicles, with their flexible and efficient handling capabilities, have become commonly used equipment for container storage.

As a high-efficiency, track-guided handling device, a multi-layer shuttle vehicle completes cargo movement between layers on a traveling platform formed by tracks installed on shelf columns. During movement, the traveling motor drives the traveling wheels to generate power. This power is transferred through the relative friction between the traveling wheels and the tracks, enabling forward or backward movement along the track. Typically, when friction generates traveling power, various factors, such as the traveling wheel surface material, motor output torque, and uneven track surfaces causing wheel bounce, result in a significant discrepancy between the pulse count output by the traveling motor and the actual distance traveled by the wheels. This phenomenon can roughly be defined as slippage. Especially when the shuttle vehicle is heavily loaded and moving at high speeds, the slippage becomes more pronounced, making it difficult for the shuttle vehicle to accurately reach the designated loading/unloading station, causing position deviations in cargo transportation and limiting the improvement of overall logistics efficiency and the effective management of warehouse stations.

As described above, several factors contribute to slippage of the traveling wheels in the prior art, which can be summarized as follows: 1. Installing an encoder on the driven wheel, which uses the smaller amount of slippage on the driven wheel to replace the driving wheel for distance verification and correction. Although this can solve the problem of inaccurate short-distance positioning, it is challenging to achieve long-distance verification in scenarios with long aisles and heavy shuttle loads. There are still technical challenges of inaccurate measurement requiring repeated correction. An example can be seen in the prior art, patent application number CN202110462768.0, titled "Positioning and Automatic Distribution Control System for Steel Metallurgy Rail Distribution Vehicle." 2. Using a positioning marker counting method, where the shuttle vehicle calculates its actual traveled distance and position by counting the number of positioning markers detected along its travel route. This method can address long-distance positioning issues to some extent when the traveling speed is not high and the shelves are well-installed. However, it has high requirements for load, shelf installation quality, speed, and acceleration parameters. It cannot effectively handle errors in marker counting caused by vehicle bounce due to long-term high-load operation or shelf aging. An example is shown in prior art, patent application number CN201910921041.7, titled "Shuttle Vehicle Traveling and Controlling Method, Device, Computer Equipment, and Storage Medium." 3. Planning precise motion curves and motor speed parameters output through the controller of an upper system. By calculating the remaining travel distance using real-time position feedback from the encoder, a fully closed-loop control mode can be achieved. However, this method requires a high-performance controller for each shuttle vehicle. Due to the limited capacity of controllers to process multiple algorithms simultaneously, this solution results in high system equipment costs, making it difficult to widely implement and popularize.

In view of the above, this patent application is proposed.

SUMMARY

The shuttle vehicle traveling and positioning control method based on encoder self-correction proposed by the present invention aims to address the problems in the prior art by providing a self-correction solution based on track positioning markers and an external encoder. As the shuttle vehicle passes each marker, it provides real-time feedback and updates the servo target position to continuously eliminate cumulative errors caused by slippage, thereby achieving a fully closed-loop control process for traveling and positioning guided by continuously calibrated position information.

To achieve the above design objective, the shuttle vehicle traveling and positioning control method based on encoder self-correction in this application includes the following implementation stages:

1) Performing Customization and Initialization

At least one positioning sensor is installed on the shuttle vehicle, and several positioning markers for detection are arranged at intervals on the track.

When the shuttle vehicle is powered on for the first time, it determines the origin of the track and the position of the initial positioning marker on the track, initializes encoder data, and sets the initial position data for the servo driver.

2) Performing Self-Learning

The shuttle vehicle operates at low load and low speed, traversing each positioning marker on every shelf layer, recording the encoder value generated for each positioning marker, and creating an array Storage[i] to store the corresponding data set.

3) Performing Self-Correction

After executing a cargo order transportation instruction, the controller sends the target position POS_PRI to the servo driver, which plans the traveling path and controls the traveling wheel's operation parameters by outputting corresponding pulses through the motor.

When the positioning sensor detects a positioning marker signal, it uploads the positioning information to the controller, which records the current encoder value POS_ENC and compares it one by one with the initial values in the self-learning array Storage[i] to determine the unique address information of the positioning marker specified by index i.

4) Updating A Target Position

After determining the workstation where the shuttle vehicle reaches a specific positioning marker, the value of the external encoder ENC_CD is compared with the actual position ENC_SV fed back by the servo encoder, i.e., Delta_Pos=ENC_CD−ENC_SV.

If Delta_Pos≠0, the controller sends the updated target position POS_NEW to the servo driver, which controls the traveling wheel to execute the traveling command according to the updated target position POS_NEW.

5) Handling A Position Offset

When the shuttle vehicle reaches the positioning marker before the target position, it reduces its traveling speed to a lower value and moves at a constant speed. Upon passing the positioning marker at this point, it follows the processes of correction in stage 3) Performing Self-Correction and in stage 4) Updating A Target Position as described above.

When the shuttle vehicle reaches the target position marker and receives the stop signal from the controller, it immediately executes the traveling interrupt program.

The current external encoder value POS_ENC is recorded, and the allowable range for this positioning marker is ±T. Based on the direction of the shuttle vehicle (positive direction adds, negative direction subtracts), the controller sends a target position command POS_TAR to the shuttle vehicle, where POS_TAR=POS_ENC±T.

The final position of the servo driver is updated to the value in the self-learning array Storage[i] corresponding to the current positioning marker. The servo driver controls the traveling wheel to execute a single travel based on the target position command POS_TAR, ultimately eliminating errors caused by slippage.

Furthermore, the process of comparing the current encoder value POS_ENC with the initial values in the self-learning array Storage[i] includes the following steps:

Setting the value range of i in the self-learning array Storage[i] as [H_Min, H_Max], where H_Min is the minimum address information corresponding to the positioning marker, and H_Max is the maximum address information corresponding to the positioning marker;

Step (1) Setting the initial value of the array index i as H_Min;

Step (2) When the positioning sensor detects a positioning marker signal, the encoder value POS_ENC is compared with the value in the self-learning array Storage [i], i.e., POS_DIF=|POS_ENC-Storage[i]|;

Step (3) If the calculation result POS_DIF is within the allowable error range, i.e., POS_DIF≤POS_TOR, where POS_TOR is the allowable position error between two adjacent positioning markers, POS_DIF is updated as the current encoder value, and the comparison loop ends;

Conversely, if the calculation result POS_DIF is not within the allowable error range, i.e., POS_DIF>POS_TOR, the array index i is incremented by 1;

Step (4) Determine whether the array index i is out of bounds. When H_Mind≤i≤H_Max, repeat Step (2) until the specific value of the array index i is determined to uniquely specify the positioning marker address information;

If the array index i is out of bounds, the controller determines that the encoder error is too large to be corrected, and the loop ends.

Furthermore, the positioning markers can be any one or a combination of positioning holes, positioning protrusions, positioning plates, QR codes, or labels.

In summary, a shuttle vehicle traveling and positioning control method based on encoder self-correction in this application has the following advantages:

1. This application addresses the slippage phenomenon that frequently occurs with heavy load and high-speed movement in existing shuttle vehicles by proposing a self-correction control solution combining external encoders with positioning markers. The encoder is set on one side of the vehicle to detect each track marker in real-time, instantly correcting the shuttle vehicle's traveling position, thus continuously eliminating cumulative errors caused by slippage and achieving fully closed-loop control for shuttle vehicle traveling and positioning, significantly improving the success rate of single-positioning.

2. The corrected encoder values during traveling are fed back to the controller, allowing for real-time updates of the servo target position. The controller transmits position commands to the servo driver through a bus transmission mode, so it has low requirements for controller performance and can be widely implemented at a low cost, with high positioning accuracy and safety.

3. This application improves positioning control accuracy while reducing control difficulty. Through the encoder self-correction algorithm, encoder values and velocity planning curves can be updated in real time, reducing the adverse effects on positioning stability caused by factors such as traveling speed, load, travel distance, and shelf installation quality, thereby improving positioning stability.

4. By applying this method, the shuttle vehicle's running speed and shelf aisle setup length can be improved, significantly increasing the success rate of single-positioning while reducing the high requirements for shelf installation quality.

BRIEF DESCRIPTION OF DRAWINGS

The present invention is further illustrated with the following drawings.

DESCRIPTION OF EMBODIMENTS

Figure 1:
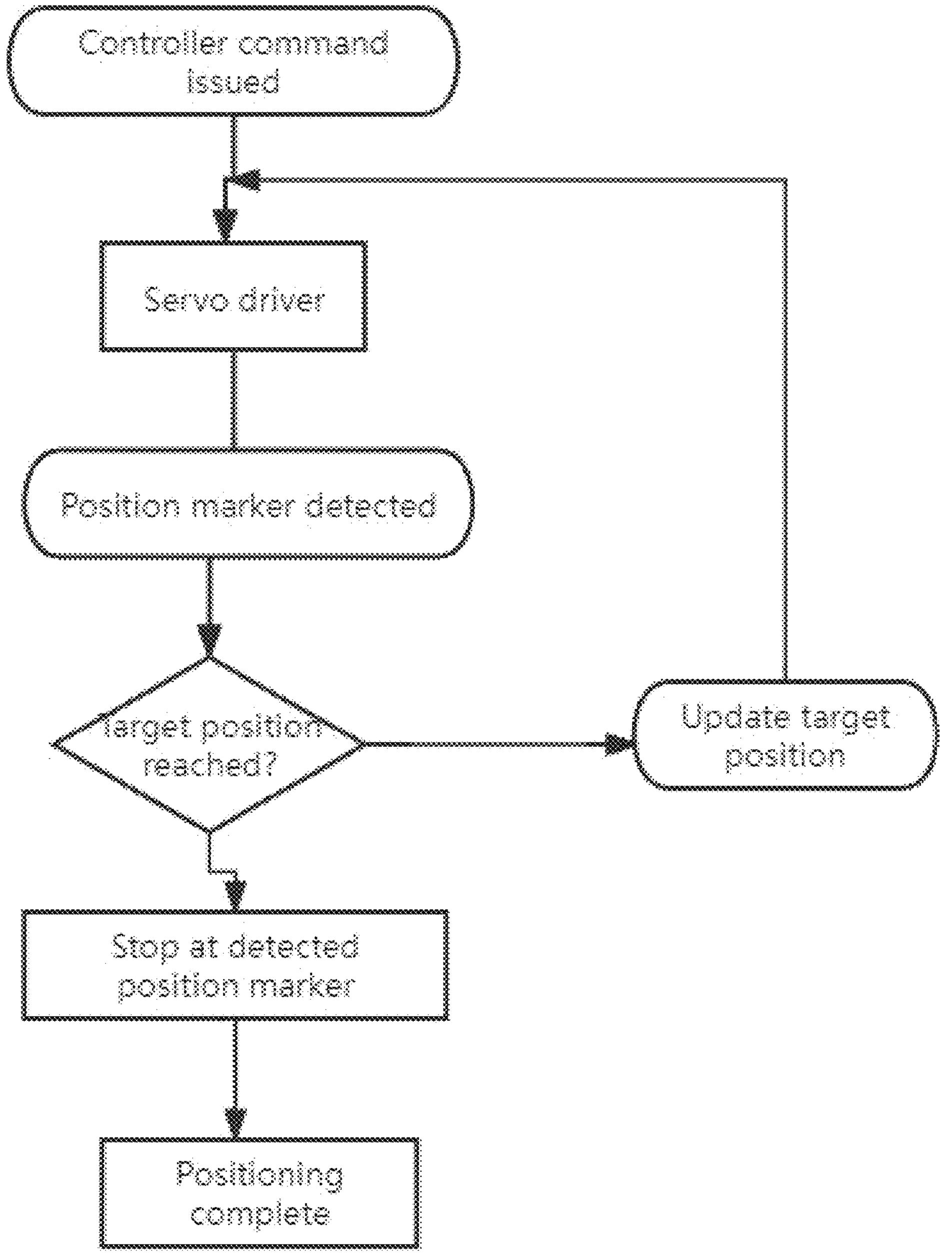
FIG. 1 is a flowchart of the shuttle vehicle traveling and positioning control method based on encoder self-correction described in this application.
Figure 2:
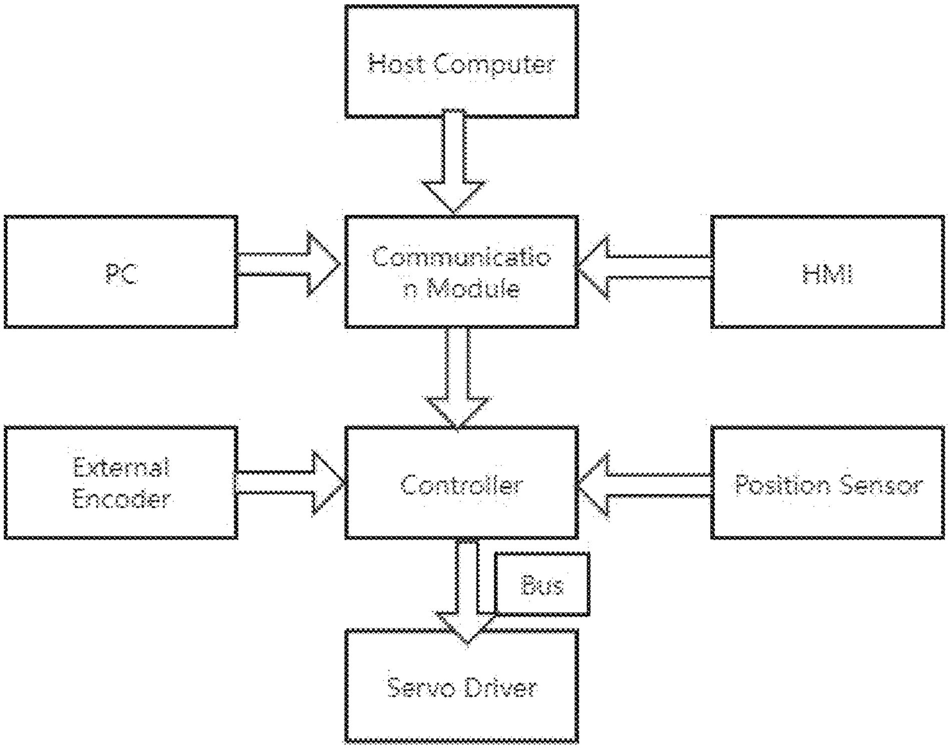
FIG. 2 is a schematic diagram of the control system module.

Example 1, as shown in FIGS. 1 and 2, the present application proposes a shuttle vehicle traveling and positioning control method based on encoder self-correction, applied to a three-dimensional logistics warehousing system. The method includes the following implementation stages:

1) Performing Customization and Initialization

The application scenario involves multi-layer shelves, which include double conveyor tracks and several shuttle vehicles traveling along the tracks.

At least one positioning sensor is installed on the shuttle vehicle, and this positioning sensor can be mounted on the vehicle body.

Several positioning markers for detection are arranged continuously at intervals (e.g., 1-3 meters) along the track. These positioning markers can be any one or a combination of positioning holes, protrusions, positioning plates, QR codes, or labels.

When moving to a positioning marker, the positioning sensor detects the positioning information and uploads it to the controller to generate the encoder value corresponding to this positioning information.

The positioning information is uniquely determined by positioning markers set on one side of the track and is defined as the address parameter set in advance. Several positioning markers form a predetermined parameter group. When a positioning sensor uploads specific positioning information to the controller, it indicates that the shuttle vehicle has reached the workstation uniquely specified by that positioning marker.

As shown in FIG. 2, the shuttle vehicle control system includes command initiation, communication transmission, logic processing, and execution mechanisms. Command initiation consists of automatic issuing by the host computer and initiation received by operators via PC or HMI.

As shown in FIG. 1, after the controller receives the control command issued by the host computer, it is transmitted to the servo driver controlling the traveling wheels of the shuttle vehicle via bus transmission through logic processing.

During shuttle vehicle traveling and positioning, the positioning marker on one side of the track is detected. The real-time updated encoder value allows for comparison between the workstation of the positioning marker and the position feedback from the servo driver. The comparison result, as deviation data, is added to the original target position of the servo driver in the form of a position compensation, thereby forming the final updated target position. This updated target position is sent to the servo driver, which then controls the traveling wheels to move according to the new target distance, achieving a one-time accurate positioning.

When the shuttle vehicle is powered on for the first time, it determines the origin of the track, the position of the initial positioning marker on the track, initializes encoder data, and sets the initial position data for the servo driver.

2) Performing Self-Learning

The shuttle vehicle operates at low load and low speed, traversing each positioning marker on every shelf layer. It records the encoder value generated for each positioning marker, creating an array Storage[i] to store the corresponding data set. The data set recorded in this array serves as the foundation for shuttle vehicle traveling and positioning.

Through the above self-learning and data storage, initial position data determined by positioning markers are established from the track origin and arranged along the traveling path. Each position address determined by a positioning marker is unique.

3) Performing Self-Correction

After the shuttle vehicle executes a cargo order, the controller sends the target position POS_PRI to the servo driver, which plans the traveling path and controls the traveling wheel's operation parameters by outputting corresponding pulses through the motor;

When the positioning sensor detects a positioning marker signal, it uploads the positioning information to the controller, which records the current encoder value POS_ENC and compares it with the initial values in the self-learning array Storage[i] one by one to determine the unique address information of the positioning marker specified by index i, thus identifying the specific workstation reached by the shuttle vehicle;

The process of comparing the current encoder value POS_ENC with the initial values in the self-learning array Storage[i] includes the following steps:

Set the value range of i in the self-learning array Storage [i] as [H_Min, H_Max], where H_Min is the minimum address information corresponding to the positioning marker, and H_Max is the maximum address information;

Step (1) Set the initial value of the array index i as H_Min;

Step (2) When the positioning sensor detects a positioning marker signal, compare the encoder value POS_ENC with the value in the self-learning array Storage[i], i.e., POS_DIF=|POS_ENC-Storage[i]|;

Step (3) If the result POS_DIF is within the allowable error range, i.e., POS_DIF≤POS_TOR, where POS_TOR is the allowable position error between two adjacent positioning markers, update POS_DIF as the current encoder value and end the comparison loop;

Conversely, if POS_DIF is not within the allowable error range, i.e., POS_DIF>POS_DIF>POS_TOR, increment the array index i by 1;

Step (4) Determine if the array index i is out of bounds. When H_Min≤i≤H_Max, repeat Step (2) until the specific value of i is determined, which uniquely specifies the address information of the positioning marker;

If the array index i is out of bounds, the controller determines that the encoder error is too large to be corrected and ends the loop;

4) Updating A Target Position

After determining the workstation of a specific positioning marker reached by the shuttle vehicle, compare the value of the external encoder ENC_CD with the actual position ENC_SV fed back by the servo encoder, i.e., Delta_Pos=ENC_CD−ENC_SV;

If Delta_Pos≠0, it indicates that slippage occurred in the traveling wheels of the shuttle vehicle during movement, meaning there is a discrepancy between the pulse count output by the traveling motor and the actual travel distance. At this point, to ensure the traveling motor moves to the correct position in one go, the target position of the servo motor needs to be updated as POS_NEW=POS_PRI+Delta_Pos;

The controller sends the updated target position POS_NEW to the servo driver, which controls the traveling wheels to execute the traveling command according to the updated target position POS_NEW;

5) Handling A Position Offset

When the shuttle vehicle reaches the positioning marker before the target position, it reduces its traveling speed to a lower value and proceeds at a constant speed. Upon passing the positioning marker, it follows the processes of correction in stage 3) Performing Self-Correction and in stage 4) Updating A Target Position as described above.

When the shuttle vehicle reaches the positioning marker at the target position and receives the stop signal from the controller, it immediately executes the traveling interrupt program;

The current external encoder value POS_ENC is recorded, and the allowable range for this positioning marker is ±T, where T depends on the size of the positioning marker;

Based on the shuttle vehicle's direction (adding for forward movement, subtracting for backward), the controller sends a target position command POS_TAR to the shuttle vehicle, where POS_TAR=POS_ENC±T.

The final position of the servo driver is updated to the value in the self-learning array Storage[i] corresponding to the current positioning marker. The servo driver controls the traveling wheel to execute a single travel according to the target position command POS_TAR, ultimately eliminating errors caused by slippage.

The above content, combined with the embodiments provided in the drawings, represents only a preferred solution to achieve the purpose of this invention. Skilled persons in the field can derive other alternative structures based on these teachings, which also fall within the scope of this invention's design.

What is claimed is:

1. A shuttle vehicle traveling and positioning control method based on encoder self-correction, comprising the following steps:

1) performing customization and initialization providing at least one positioning sensor on the shuttle vehicle, and arranging several positioning markers for detection positioning on a track at intervals;

determining an origin of the track and a position of a starting positioning marker on the track, initializing encoder data, and setting initial position data of a servo driver when the shuttle vehicle is powered on for a first time;

2) performing self-learning traversing each positioning marker on every shelf layer, recording an encoder value generated for the each positioning marker, and creating an array storage[i] to store a corresponding data set when the shuttle vehicle operates at low load and low speed;

3) performing self-correction after the shuttle vehicle executes a cargo transport order, sending a target position POS_PRI to the servo driver, by a controller, and planning a traveling path and controlling a traveling wheel's operation parameters by outputting corresponding pulses through a motor;

when the at least one positioning sensor detects a positioning marker signal, uploading a positioning information to the controller, by at least one positioning sensor, the control recording a current encoder value POS_ENC and comparing it one by one with initial values in a self-learning array storage[i] to determine positioning marker address information uniquely designated by index i;

4) updating the target position after determining a workstation where the shuttle vehicle reaches a specific positioning marker, comparing a value of an external encoder ENC_CD with an actual position ENC_SV fed back by a servo encoder, that is, Delta_Pos=ENC_CD−ENC_SV;

wherein when Delta_Pos≠0, sending an updated target position POS_NEW to the servo driver, by the controller; controlling a traveling wheel to execute a traveling command according to the updated target position POS_NEW, by the servo driver;

5) handling a position offset when the shuttle vehicle reaches a positioning marker before the target position, reducing a traveling speed of the shuttle vehicle to a lower value, and the shuttle vehicle moving at a constant speed; upon passing the positioning marker at this point, repeating performing self-correction and updating the target position;

when the shuttle vehicle reaches a positioning marker at the target position and receives a stop signal from the controller, immediately executing a traveling interrupt program;

recording the current encoder value POS_ENC of the external encoder, where a tolerance range for the positioning marker at the target position is ±T, based on the shuttle vehicle's direction, it is added when moving forward and subtracted when moving backward; sending a target position command POS_TAR to the shuttle vehicle, by the controller, where POS_TAR=POS_ENC±T;

updating a final position of the servo driver to a value in the self-learning array storage[i] corresponding to a current positioning marker; controlling the traveling wheel to execute a single travel based on the target position command POS_TAR, by the servo driver, thereby eliminating an error caused by slippage.

2. The shuttle vehicle traveling and positioning control method based on encoder self-correction according to claim 1, wherein comparing the current encoder value POS_ENC with the initial values in the self-learning array storage[i] includes the following steps:

step (1): setting a value range of i in the self-learning array storage[i] as [H_Min, H_Max], where H_Min is a minimum address information corresponding to the several positioning markers, and H_Max is a maximum address information corresponding to the serval positioning markers;

step (2): setting an initial value of an array index i as H_Min;

step (3): when the at least one positioning sensor detects the positioning marker signal, comparing the current encoder value POS_ENC with the value in the self-learning array storage[i], that is, POS_DIF=|POS_ENC−Storage[i]|;

step (4); when a calculation result POS_DIF is within an allowable error range, that is, POS_DIF≤POS_TOR, where POS_TOR is an allowable position error between two adjacent positioning markers, updating POS_DIF as the current encoder value, and ending a comparison loop;

when the calculation result POS_DIF is not within the allowable error range, that is, POS_DIF>POS_TOR, increasing the array index i by 1;

step (5): determining whether the array index i is out of bounds; when H_Min≤i≤H_Max, repeating step (3) until a value of the array index i is determined to uniquely specify the positioning marker address information;

when the array index i is out of bounds, determining that the encoder error is too large to be corrected, by the controller, and ending the loop.

3. The shuttle vehicle traveling and positioning control method based on encoder self-correction according to claim 2, wherein the positioning markers are any one or a combination of positioning holes, positioning protrusions, positioning plates, QR codes, or labels.

4. The shuttle vehicle traveling and positioning control method based on encoder self-correction according to claim 1, wherein the positioning markers are any one or a combination of positioning holes, positioning protrusions, positioning plates, QR codes, or labels.

* * * * *